United States Patent [19]

Zhou

[11] Patent Number: 5,293,128

[45] Date of Patent: Mar. 8, 1994

[54] METHOD AND APPARATUS FOR CALIBRATING THE OUTPUT MEASUREMENT OF A LOGGING TOOL AS A FUNCTION OF EARTH FORMATION PARAMETERS

[75] Inventor: Qiang Zhou, Missouri City, Tex.

[73] Assignee: Western Atlas International, Inc., Houston, Tex.

[21] Appl. No.: 909,059

[22] Filed: Jul. 2, 1992

[51] Int. Cl.$^5$ .............................................. G01V 13/00
[52] U.S. Cl. ...................................... 324/339; 324/202
[58] Field of Search ............... 324/338, 339, 202, 601; 73/1 R

[56] References Cited

U.S. PATENT DOCUMENTS

| | | | |
|---|---|---|---|
| 4,439,831 | 3/1984 | Sinclair | 324/339 X |
| 4,780,678 | 10/1988 | Kleinberg et al. | 324/338 |
| 4,849,699 | 7/1989 | Gill et al. | 324/339 |
| 4,876,511 | 10/1989 | Clark | 324/338 |
| 5,001,675 | 3/1991 | Woodward | 367/13 |

OTHER PUBLICATIONS

The Theory of 2 MHz Resistivity Tool and its Application to Measurement-While-Drilling, Coope et al., The Log Analyst, May-Jun. 1984.
MWD Resistivity Tool Response in a Layered Medium, Zhou et al., Geophysics, v56, n. 11, 1991 (no month).
Calculation of Calibration Loops for Induction Logging Tools, Boganik et al., News from Colleges, (No Month) 1965, No. 9 (with English abstract) Rachet, Ztalonirdbotsngeh Kolyet, Apparatus Induktsionnoge Karotazha.

Primary Examiner—Kenneth A. Wieder
Assistant Examiner—Warren S. Edmonds
Attorney, Agent, or Firm—William A. Knox

[57] ABSTRACT

A calibration fixture for an MWD logging tool consists of a plurality of concentric co-planar conductive calibration loops are mounted around the logging tool mandrel coaxially with the usual transmitter(s) and receivers that are mounted on the tool. The calibration loops are terminated with a multiple-tap impedance quantizing means for discretely varying the impedance of the calibration loops. When a transmitter is activated to emit an electromagnetic signal, the calibration loops are excited to reradiate a portion of that signal into the receivers with an intensity that is a function of the loop impedance thereby to simulate the effects of formations having known resistivities.

12 Claims, 4 Drawing Sheets

METHOD AND APPARATUS FOR CALIBRATING THE OUTPUT MEASUREMENT OF A LOGGING TOOL AS A FUNCTION OF EARTH FORMATION PARAMETERS

BACKGROUND OF THE INVENTION

1. Field of the Invention

This invention relates to an apparatus and method for calibrating an electromagnetic logging tool such as an induction logger, that is used to measure the conductivity of the surrounding formation while a borehole is being drilled therethrough. The apparatus is particularly useful as a secondary standard for field use in testing MWD loggers.

2. Discussion of the Prior Art

Electromagnetic (induction) logging tools for measuring the electrical properties of subsurface earth formations are well known. The logging tool may be run into a borehole on a wireline after the hole has been drilled. Alternatively the tool may be incorporated into the lower end of the drill string, near the bit so as to log the formation parameters while the borehole is being drilled (i.e. Measurement While Drilling or MWD). The advantage of the latter method is that he tool can measure formation parameters before the borehole sidewall has become contaminated with the drilling fluids. Furthermore, the desired measurements are gathered in near real time rather than days or weeks later as is the case with wireline logging.

Typical induction tools consist essentially of a transmitter coil and two receiver coils that are mounted concentrically on a mandrel. The two receiver coils may be separated by, perhaps, 30 cm and the transmitter coil may be about 0.7 m from the nearest receiver coil. In some tools, a second transmitter is provided at the opposite end of the receiver array. The respective coils commonly consist of several turns of wire of a suitable size that are insulated from the mandrel. An electronics module is incorporated into the tool to provide power to the transmitter coil and to detect the signals in the receiver coils. Means are furnished to either store the measured formation parameters or to transmit the gathered data to surface equipment, or both.

At timed intervals such as every 100 milliseconds (ms), a 1-or 2-mHz sinusoidal signal at a potential of about 200 volts is launched into the transmitter coil. If two transmitter coils are provided, the transmitters are excited in alternative cycles and the received signals resulting alternate cycles are averaged. The electromagnetic field radiates outwardly from the transmitter, through the formation surrounding the borehole, to each of the receivers in turn. The received signals are very weak, on the order of 1 to 500 $\mu v$. The phase difference between the signals received by the respective receivers, as well as the amplitude ratio are parameters that are a function of the formation resistivity which may range from about 0.1 to about 100 ohm-meters or more. Those measurements provide a penetration depth into the sidewall formation of nearly two meters.

An induction logging tool is essentially a precision voltmeter that must be calibrated with respect to a laboratory standard. Usually, the tool is calibrated in a large brine tank where the resistivity of the test medium (salt water) can be accurately controlled. The test results take the form of response curves plotted as formation resistivity vs. phase shift and amplitude ratio. See for example, FIGS. 1 and 2.

MWD logging tools must be rugged to withstand the drilling stresses. Made of conductive but non-magnetic metal such as beryllium-copper or monel metal, an MWD logging tool may be two or three meters long, 15 in diameter and is quite heavy. A secondary standard is used for field calibration of an MWD induction logging tool in the field both before and after a logging run. Of course, there is no reason why a portable secondary standard could not also be used on-site to confirm the calibration of a wireline tool.

The theory of the operation of an inductive logging tool mounted on a conductive mandrel is explained in a paper entitled *The theory of 2 mHz Resistivity Tool and its Application to Measurement-While-Drilling* by D. Coope et al. in *The Log Analyst*, v. 25, No. 3, May-June, 1984. The concepts are well known. Hence it is not considered to be necessary here to expand further upon the theory of operation. An analysis of the response of an MWD tool is presented by Q. Zhou et al. in *MWD Resistivity Tool Response in a Layered Medium*, published in *Geophysics*, v. 56, No. 11, November 1991.

U.S. Pat. No. 4,876,511, issued Oct. 24, 1989 to Brian Clark for a Method and Apparatus for Testing and Calibrating an Electromagnetic Logging Tool, discloses an external testing apparatus for a logging tool which includes at least a transmitting antenna and dual-channel receiving antennas. A shielded receiving device is clamped around the transmitting antenna and intercepts the transmitted signal. A shielded transmitting device is positioned around the receiving antennas of the tool and transmits to the receiving antennas a signal which has a phase and/or amplitude that is related to the signal transmitted by the tool's transmitting antenna in a known manner. It simulates the effect that a geological formation would have on the signal if it were to travel from the tool's transmitting antenna through the formation. Since the simulated effect is known, the output of the tool may be verified as being correct or it may be corrected if it is erroneous.

Another reference is found in U.S. Pat. No. 5,001,675, issued Mar. 19, 1991 to G. H. Woodward for a Phase and Amplitude Calibration System for Electromagnetic Propagation Based on Earth Formation Evaluation Instruments. The invertor teaches an automatic calibration system which compensates for errors caused by temperature and pressure variations in a borehole. In this system, an auxiliary calibration antenna is tightly coupled physically to each of the spaced-apart receiving antennas of a dual-channel logging tool. In-phase equal-amplitude reference signals are applied to the two measurement channels from the calibration antennas to the respective receiving antennas. Each of the calibration antennas communicates with an attenuator which acts to make the calibration antennas transparent to the receiving antenna when the latter are in the measurement mode.

A Russian paper entitled *Calculation of Calibration Loops for Induction Logging Tools*, by V. N. Boganik et al., published in *News From Colleges*, 1965, No. 9, describes a single closed calibration loop that may be used with a wireline tool.

The first reference discloses a rather awkward calibration assembly that must be clamped around the logging tool mandrel. In addition, a good deal of complex circuitry is required to match the calibration antennas to the receiving and transmitting antennas that are mounted on the tool itself. The second reference is merely a relative compensation device to equalize the parameter measurements from different depths to a common base line. The device of the '675 patent is not an absolute-value calibration tool. The Russian device is a single closed loop suitable for use with a wireline logger but not with MWD equipment.

There is a need for a simple, portable secondary calibration standard that first can be exercised in the laboratory and later used for field testing of a logging tool. It is desirable that the calibration device should be passive and not dependent for its operation upon auxiliary circuitry which, itself, would require calibration.

SUMMARY OF THE INVENTION

A calibration device is provided for a down-hole electromagnetic logging tool, the tool including a conductive mandrel for concentrically supporting at least a transmitter and a pair of spaced-apart receivers. The calibration device includes multiple concentric co-planar conducting loops mounted concentric with the two spaced-apart receivers. Each conductive loop includes a multiple-tap series resistor for simulating the effect of formations having different known resistivities on the ratio of the signal amplitudes as seen by the two receivers when the conductive loops are excited by an electromagnetic field radiated by the transmitter.

In another aspect of this invention, each conductive loop includes in addition, a series capacitor for simulating the effect of formations characterized by different known resistivities, on the phase difference between the signals as seen by the two receivers when excited by an electromagnetic field radiated by the transmitter.

A method for calibrating an electromagnetic logging instrument that includes a conductive mandrel upon which are concentrically mounted a transmitter and two spaced-apart receivers remote from the transmitter. The method includes the steps of mounting a plurality of co-planar conductive loops concentric with the receivers. Inserting a multiple-tap series resistor in each of the plurality of conductive loops. Radiating an electromagnetic field from the transmitter. Intercepting a portion of the radiated electromagnetic field by the plurality of conductive loops and reradiating the intercepted field portion into the receivers. Adjusting the resistance of the tapped series resistors in known discrete steps to simulate the effect of formations having different known resistivities. Measuring the amplitude ratios of the signals seen by the two receivers as a function of the known formation resistivity corresponding to each discrete resistance step.

The method further includes the additional step of inserting a capacitor in series with the tapped series resistors and adjusting the resistance thereof in known discrete steps to simulate the effect of different formations having known resistivities. Measuring the phase shift between the signals, as seen by the two receivers, as a function of the known formation resistivity corresponding to each discrete resistance step.

A method for calibrating an electromagnetic logging tool that includes at least one transmitter and a pair of receivers, all concentrically mounted in spaced-apart configuration on a mandrel. The calibration is accomplished by propagating an electromagnetic field from the transmitter. An electromagnetic radiator is interposed between the transmitter and the receivers. When the electromagnetic radiator is excited by the electromagnetic field radiated by the transmitter, the radiator electrically irradiates the pair of receivers at selected discrete intensity levels that simulate the effect of formations having different known resistivities.

In response to the irradiation, in one embodiment, the two receivers generate output signals having an amplitude ratio that is a function of the simulated formation resistivity. In a second embodiment, the two receivers generate output signals whose phase difference is a function of the simulated formation resistivity.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention:

FIG. 4b is a cross section along line 4b-4b of FIG. 4a;

DETAILED DESCRIPTION OF THE PREFERRED EMBODIMENT

Figure 2:
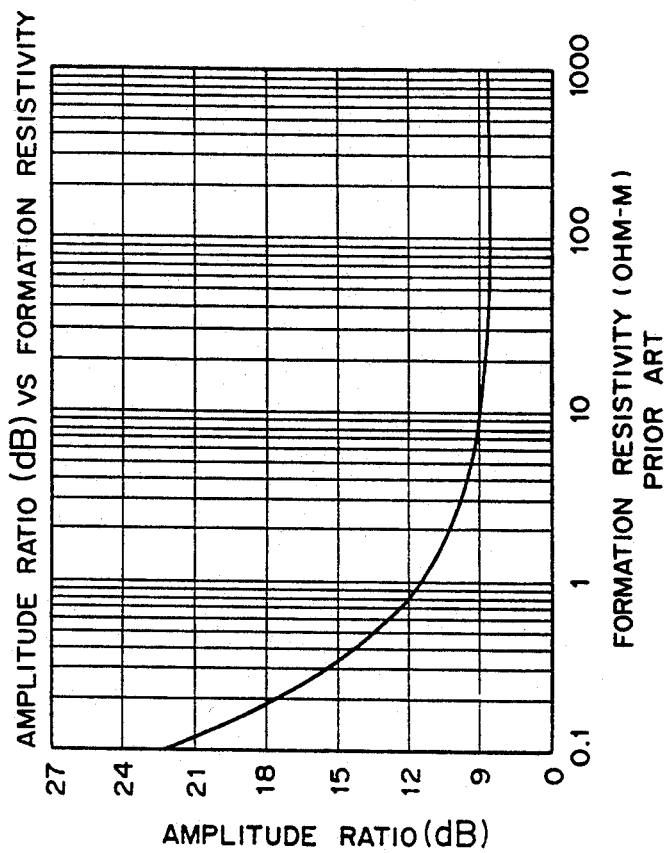
FIG. 2 is the response curve that relates the measured signal amplitude ratio to formation resistivity.
Figure 1:
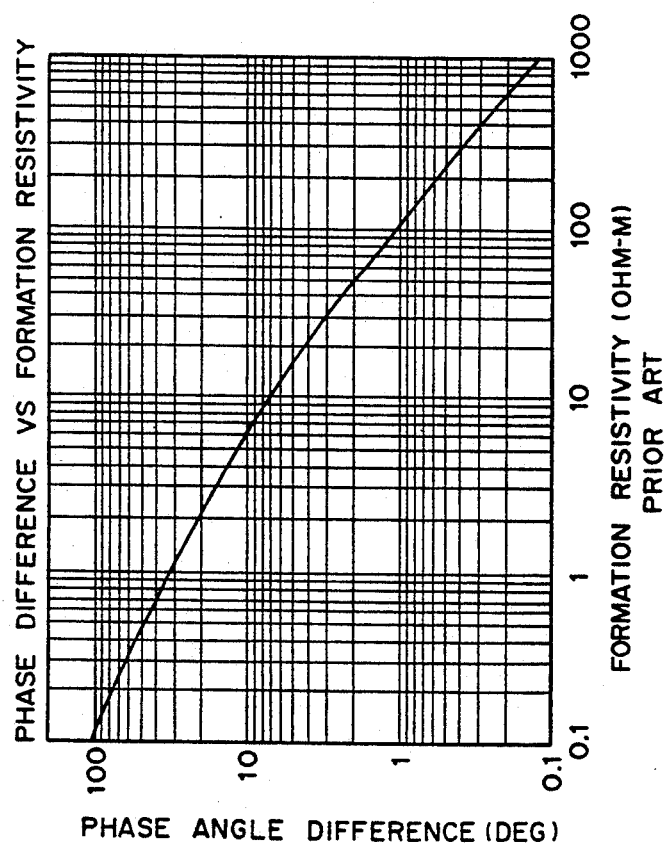
FIG. 1 shows the response curve for the measured signal phase angle difference between two receivers as a function of formation resistivity.
Figure 3:
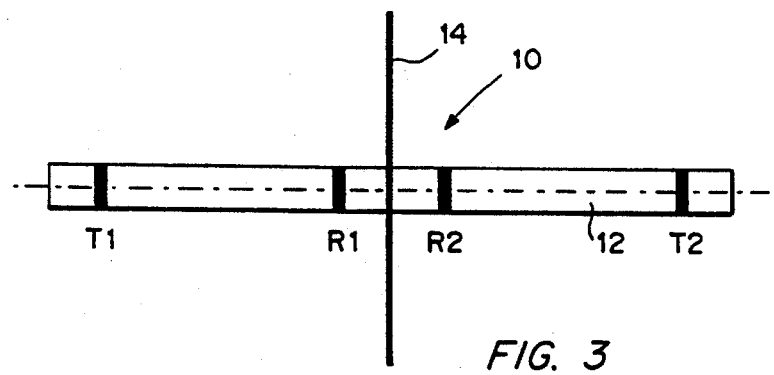
FIG. 3 illustrates schematically the method of mounting the calibration device on an MWD mandrel.

FIG. 3 is a schematic drawing of an induction logger assembly generally shown as 10. The assembly consists of a mandrel 12, which, in the case of an MWD tool is conductive but non-magnetic. Transmitter wire-coils T1 and T2 are wrapped coaxially on the mandrel in grooves (not shown) cut around the outer surface of the mandrel. The two coils may be about 1.7 meters (m) apart. Receiver wire-coils R1 and R2 are coaxially wrapped in grooves betwixt the transmitter coils as shown, separated by about 0.3 m. The respective transmitter and receiver coils are insulated from the conductive mandrel. Suitable electronics modules (not shown) are incorporated inside the logging tool.

In operation, the transmitter wire-coils act as transmitting antennas for an electromagnetic field and the receiver coils serve as receiving antennas. For brevity, we shall refer to those items as transmitters or receivers respectively. For calibration purposes, a calibration fixture 14 is positioned around the mandrel, preferably between the receivers but not necessarily limited to that location. The calibration fixture consists of a plurality of closed conductive loops that are co-planar and concentrically mounted around the mandrel coaxially with the transmitters and receivers.

Although the theory of operation of the induction tool is known, it will be briefly viewed here with respect to a single calibration loop. When a transmitter is excited in the absence of a calibration loop, a voltage $V_P$ is induced in the receivers. If we add a closed conductive loop, a voltage $V_L$ is induced in the loop which re-radiates a voltage contribution $V_S$ to the receivers. Then the total voltage, $V_t$ induced in the receivers with a calibration loop present, is $$V_t = V_p + V_s. \qquad (1)$$

$V_s$ can be calculated from the voltage $V_L$ and current $I_L$ induced in the calibration loop. The quantity $V_L$ can be calculated by the method of Coope et al. cited earlier. The induced current in the calibration loop is given by $$I_L = V_L/Z_L \qquad (2)$$

where the loop impedance $Z_L$ is $$Z_L = R_L + i2\pi f L_L. \qquad (3)$$

The internal resistance $R_L$ and self-inductance $L_L$ of the loop can be calculated or measured, f is the operating frequency and i is the quadrature operator. From (2), the voltage $V_s$ induced in the receiver can be quantified.

From equation (3) it will be seen that the voltage induced in the receivers is a function of the resistance of the calibration loop. By introducing an external variable or quantizing resistor, R, having multiple taps to provide discrete resistance steps, in series with the internal resistance $R_L$ of the calibration loop, corresponding discrete voltage levels will be induced into each of the receiver coils. The ratio of the discrete induced voltage (amplitude) levels can be correlated with formation resistivities based upon laboratory measurements on the calibration fixture in a test tank as earlier explained. The variable resistor in combination with the conductive calibration loop thus simulates the effect of formations having different known resistivities.

I have found that, for amplitude-ratio measurements, a single calibration coil, while useful, does not provide a dynamic range sufficiently broad to simulate the effect of formations that have a wide variation in resistivity. Accordingly, I provide a multiple-loop configuration as will be described later in connection with FIGS. 4a and 4b. When a multiple-loop configuration is used, the mutual inductance between the loops must be considered.

I have also found that to increase the dynamic range of phase-angle-difference measurements, it is preferable that the calibration loop impedance $Z_L$ should be nearly pure resistance. To that end, for phase-angle-difference measurements, an optional capacitor having capacitor C, is coupled in series with the variable resistor R so that the external impedance $Z_e$ becomes $$Z_e = R + [1/i2\pi fC]] \qquad (4)$$

Figure 4A:
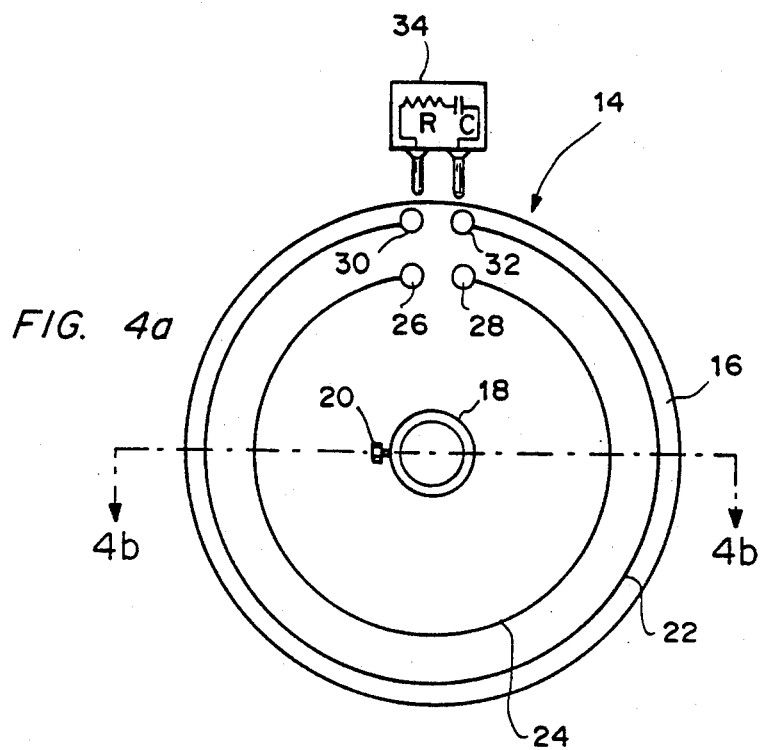
FIG. 4a is a plan view of one form of the calibration fixture showing multiple calibration loops and a plug-in external impedance module for terminating the calibration loops.
Figure 4C:
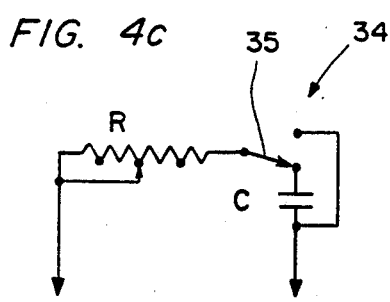
FIG. 4c is a schematic diagram of an external impedance circuit for terminating the calibration loops.
Figure 4B:
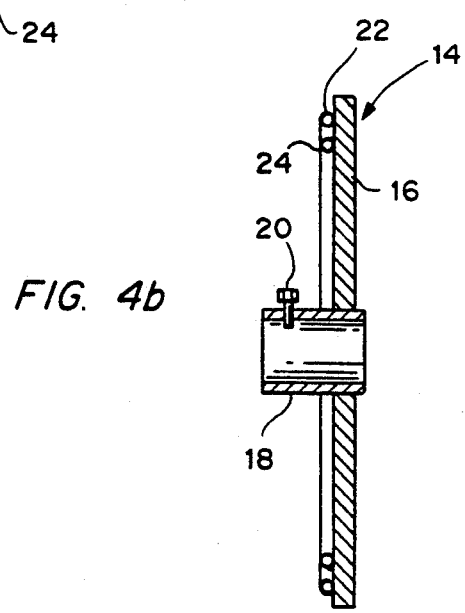

FIGS. 4a and 4b illustrate a multiple-loop calibration fixture 14. The fixture consists of a flat disk-like support 16 of some insulating material such as epoxy or other plastic. It has a radius of about 0.5 m and may be one or two centimeters thick. A collar 18 of suitable material fits in the center of disk 16. The inner diameter of the collar is sufficient to slide over the outer diameter of mandrel 12 (FIG. 3). The fixture is locked in place on the mandrel by means of one or more set screws such as 20. Two conductive calibration loops 22 and 24 are fastened to disk 16 by any convenient means. Two loops are shown by way of example but not by way of limitation since up to five or more loops may be used and indeed, are preferred. Each loop is terminated by female plugs such as 26 and 28, 30 and 32, for receiving the prongs of external impedance module such as 34 in series with a loop. Module 34 includes a resistor R and capacitor C. A module is provided for each loop. Several modules, each having a different-valued fixed resistor may be used for calibration purposes or a single module having a tapped variable resistor could be used such as shown in FIG. 4c. The version in FIG. 4c forms a multiple-tap impedance quantizing means for the calibration loop that it terminates. For phase-angle difference measurements, separate modules may be furnished either with or without capacitors or means such as 35, FIG. 4c, can be supplied to switch the capacitor out of the circuit as desired.

The two exemplary loops shown in FIGS. 4a and 4b have radii of 0.5 and 0.44 meter respectively. Their self-inductances are 4.7 and 4.4 $\mu H$ and the mutual inductance is 1.24 $\mu H$. The wire resistances of the loops are 0.52 and 0.46 ohm. The capacitance, if used, is 5.6 nF. The quantities listed are exemplary only; they should not be considered to be limiting.

From the above discussion, it is seen that the calibration fixture 14 is completely passive in operation. It is simple in construction and is readily portable for use in the field. In effect, the calibration fixture serves as an electromagnetic radiator that is interposed between a transmitter and the receivers. When the radiator is excited by the electromagnetic field propagating from the transmitter, the radiator irradiates the receivers at selected discrete intensity levels to simulate the effect of formations having different known resistivities.

Figure 5:
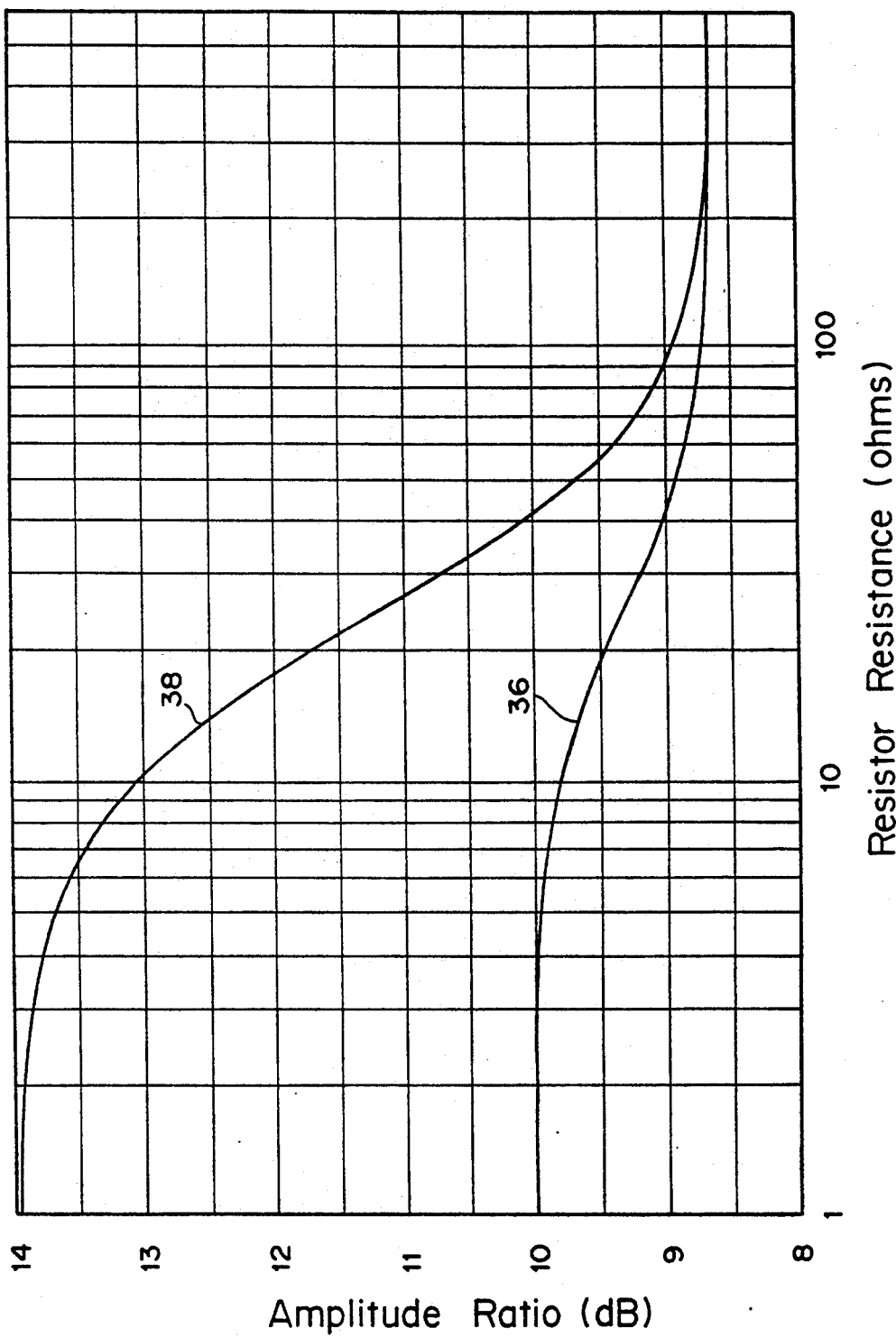
FIG. 5 exhibits the dynamic ranges of the signal amplitude ratio as seen by one loop vs. multiple loops as a function of the value of a quantizing resistor.

FIG. 5 is a graph that shows the amplitude ratio, in dB, between the output signals from the two receivers as a function of the value of the external quantizing resistor (without a series capacitor) for a single calibration loop, curve 36, and for a set of five calibration loops, curve 38. The substantial improvement in dynamic range using multiple loops is quite apparent.

Figure 6:
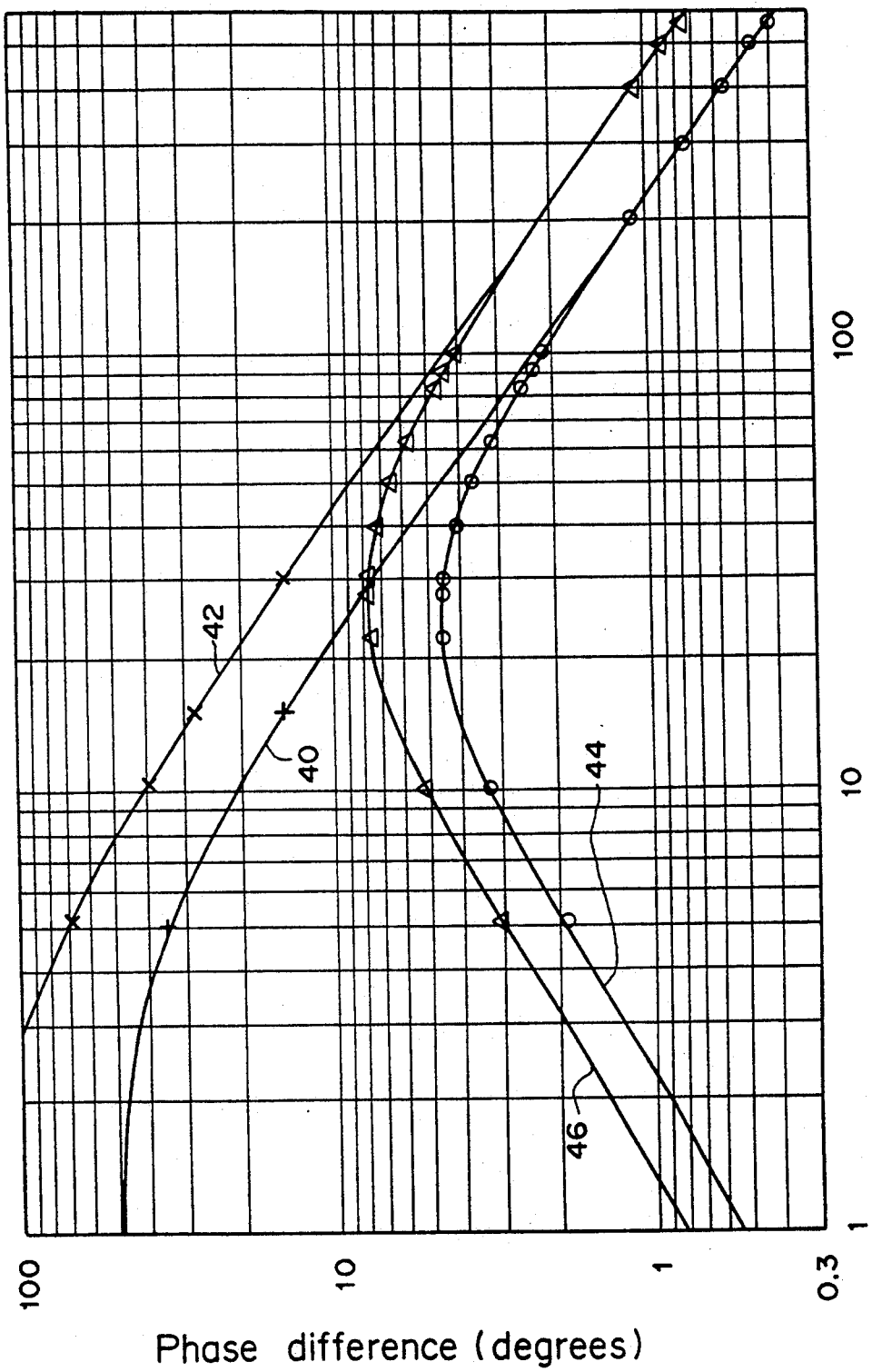
FIG. 6 compares the dynamic range of the phase angle difference as seen by one loop vs. multiple loops as a function of the value of a quantizing resistor in the presence of a series capacitor.

FIG. 6 is a graph of the phase-angle difference, in degrees, between the output signals of the two receivers as a function of the value of the external quantizing resistor with the series capacitor, for a single loop, curve 40 and for multiple calibration loops, curve 42. Curves 44 and 46 show the responses for single and multiple loops respectively without a series capacitor. Without the series capacitor, the calibration tool is virtually useless for phase-angle difference measurements. The multiple-loop configuration, with capacitors, provides a definite improvement in dynamic range.

For a calibration operation, the induction logging tool is laid across supports or is air-hung from a sky hook. The calibration fixture 14, whose calibration accuracy had been previously verified in the laboratory, is removably positioned over mandrel 12 and locked in place at a desired location therealong with set screw 20. It is assumed of course that the internal electronics module associated with the logging tool is provided with externally-accessible test-probe jacks. The transmitter(s) is excited to radiate an electromagnetic field. The eddy currents induced in the calibration loops re-radiate a contribution signal to the receivers provided that one or more loops are terminated by corresponding external impedance modules such as 34. An unterminated loop is ineffective.

During a first test cycle, the quantizing resistors associated with each loop are adjusted in discrete steps and the observed amplitude ratio between the receiver output signals is noted for each discrete calibration step. The difference between the observed amplitude-ratio values and the true amplitude-ratio values is recorded in a correction table. The true amplitude-ratio value corresponding to each discrete resistor step as picked from a calibrated graph such as that of FIG. 5. A second calibration cycle may then be run for producing a phase-angle difference correction table. Alternatively, if such a capability is included in the internal electronics module of the tool, the error corrections can be introduced instrumentally by tweaking the calibration circuitry.

This invention has been described with a certain amount of particularity for exemplary purposes only. Those skilled in the art will conceive of variations in the method and equipment but which will nevertheless fall within the scope and spirit of the disclosure which is limited only by the appended claims.

What is claimed is:

1. A passive calibration fixture for use with an air-hung electromagnetic logging tool, the logging tool including an elongated mandrel, having a longitudinal axis, for axially supporting at least one transmitter and two spaced-apart receivers mounted remotely from the transmitter, comprising:

an insulating support means removably secured around said mandrel between said transmitter and said receivers;

a plurality of concentric coplanar conductive calibration loops mounted on said support means for receiving radiation from said transmitter and for reradiating the received radiation to said receivers, said calibration loops being mounted coaxially with said transmitter and receivers;

multiple-tap impedance quantizing means for terminating each one of said conductive calibration loops in discrete steps such that the radiation reradiated to said receivers is attenuated by said quantizing means to simulate, when said tool is under calibration, the signal attenuation effects of earth formations having different resistivities.

2. The calibration fixture as defined by claim 1, wherein each said impedance quantizing means is a variable series resistor.

3. The calibration fixture as defined by claim 2, wherein:

each said impedance quantizing means includes a fixed series capacitor.

4. A method for calibrating an electromagnetic logging tool prior to its deployment for use in measurement-while-drilling operations, said tool including at least one transmitter and a pair of receivers, all of which are concentrically mounted in spaced-apart configuration on a conductive mandrel, comprising:

interposing an electromagnetic radiator between said transmitter and said receivers;

exciting said electromagnetic radiator by an electromagnetic field radiated from said transmitter; and varying, in discrete steps, the impedance value of said electromagnetic radiator so that it irradiates said receivers at selected discrete intensity levels, the discrete intensity levels simulating the signal-attenuation effects of electromagnetic signals propagating through earth formations having different known resistivities thereby to quantify receiver output signals as a function of said known resistivities.

5. The method as defined by claim 4, comprising:

measuring the amplitude ratios of the output signals from said receivers as a function of said discrete impedance values;

providing a calibration table of formation resistivity vs. true amplitude ratio as a function of the discrete impedance values; and comparing the measured amplitude ratios with the true amplitude ratios corresponding to each selected discrete impedance value to determine a correction factor to be applied to the measured receiver output-signal amplitude ratios.

6. The method as defined by claim 4, comprising:

measuring the phase-angle differences of the output signals from said receivers as a function of said discrete impedance values;

providing a calibration table of formation resistivity vs. true phase-angle difference corresponding to each selected discrete impedance value; and comparing the measured phase-angle difference with the true phase-angle difference corresponding to each selected discrete impedance value to determine a correction factor to be applied to the measured receiver output-signal phase-shift differences.

7. A method for providing a calibration curve for correlating measured output signals from an electromagnetic logging instrument with known earth parameters, the instrument including a mandrel upon which are concentrically mounted a transmitter and two spaced-apart receivers remote from the transmitter, comprising:

mounting a plurality of co-planar conductive calibration loops around said mandrel concentrically with the transmitter and receivers;

terminating each said calibration loop with a multiple-tap series resistor;

radiating an electromagnetic field from said transmitter;

intercepting a portion of the radiated electromagnetic field by the plurality of calibration loops and reradiating the intercepted electromagnetic field portion into the receivers to induce output signals therefrom;

adjusting the tapped series resistors in known discrete steps for attenuating the level of the electromagnetic field that is re-radiated into said receivers to simulate the signal-attenuation effects of earth formations having different known resistivities; and measuring the amplitude ratios of the induced receiver output signals as a function of the known formation resistivities corresponding to the discrete resistance steps and plotting a calibration curve relating said measured amplitude ratios as a function of said known formation resistivities.

8. The method as defined by claim 7, comprising:

inserting a fixed capacitor in series with the tapped series resistors for each said calibration loop; and measuring the phase-angle difference between the receiver output signals as a function of the known formation resistivities corresponding to the discrete resistance steps and forming said calibration curve by plotting the measured phase shift differences as a function of the known formation resistivities.

9. The calibration fixture as defined by claim 1, wherein
said calibration loops are located midway between said receivers.

10. The calibration fixture as defined in claim 1, wherein said mandrel is electrically conductive.

11. The method as defined by claim 4, wherein said electromagnetic radiator includes a plurality of conductive calibration loops, each of which is terminated by an external impedance, the value of which is adjustable in discrete steps.

12. The calibration fixture as defined by claim 1, wherein:
said co-planar conductive calibration loops extend radially in a plane perpendicular to the longitudinal axis of the elongated mandrel.

* * * * *